(12) United States Patent
Ide et al.

(10) Patent No.: US 8,839,818 B2
(45) Date of Patent: Sep. 23, 2014

(54) VALVE DEVICE AND TEMPERATURE ADJUSTING SYSTEM FOR ELECTRONIC DEVICE

(75) Inventors: Tadateru Ide, Tokyo (JP); Tsuyoshi Yamashita, Tokyo (JP)

(73) Assignee: Advantest Corporation, Tokyo (JP)

( * ) Notice: Subject to any disclaimer, the term of this patent is extended or adjusted under 35 U.S.C. 154(b) by 466 days.

(21) Appl. No.: 12/742,178

(22) PCT Filed: May 27, 2009

(86) PCT No.: PCT/JP2009/059703
§ 371 (c)(1),
(2), (4) Date: May 10, 2010

(87) PCT Pub. No.: WO2010/137137
PCT Pub. Date: Dec. 2, 2010

(65) Prior Publication Data
US 2011/0126931 A1    Jun. 2, 2011

(51) Int. Cl.
*F16K 11/085*    (2006.01)
(52) U.S. Cl.
USPC .................. 137/625.47; 137/625.16; 251/118
(58) Field of Classification Search
USPC ............. 137/625.15, 625.16, 625.46, 625.47; 251/118; 165/103, 221, 255
See application file for complete search history.

(56) References Cited

U.S. PATENT DOCUMENTS

| | | | | |
|---|---|---|---|---|
| 627,019 A | * | 6/1899 | Streubel | 137/625.16 |
| 2,822,821 A | * | 2/1958 | Gordon | 137/625.23 |
| 3,211,534 A | * | 10/1965 | Ridgway | 422/115 |
| 3,354,904 A | * | 11/1967 | Federle et al. | 137/556.6 |
| 3,411,538 A | * | 11/1968 | Gruner et al. | 137/625.29 |
| 3,536,296 A | * | 10/1970 | Burris | 251/208 |
| 3,710,251 A | | 1/1973 | Hagge et al. | |
| 3,721,265 A | * | 3/1973 | Hoffland | 137/625.47 |
| 3,927,693 A | * | 12/1975 | Johnston | 137/625.47 |
| 4,164,956 A | * | 8/1979 | Takahashi et al. | 137/242 |
| 4,846,213 A | * | 7/1989 | Hutchens et al. | 137/241 |
| 5,108,075 A | * | 4/1992 | Downard et al. | 251/209 |
| 5,135,026 A | * | 8/1992 | Manska | 137/555 |
| 5,375,622 A | * | 12/1994 | Houston | 137/240 |
| 5,529,758 A | * | 6/1996 | Houston | 422/171 |

(Continued)

FOREIGN PATENT DOCUMENTS

| | | |
|---|---|---|
| CN | 2042546 | 8/1989 |
| GB | 500506 | 2/1939 |

(Continued)

OTHER PUBLICATIONS

China Office action, mail date is Aug. 1, 2012.

(Continued)

*Primary Examiner* — John Fox
(74) *Attorney, Agent, or Firm* — Greenblum & Bernstein, P.L.C.

(57) ABSTRACT

A valve device for adjusting the flow volumes of a cooling medium and a heating medium for adjusting the temperature of an electronic device includes: flow paths through which a cooling medium and heating medium are able to flow; and a merging section into which these flow path merge. The merging section has a valve shaft internally and a first channel is formed in the valve shaft. The valve shaft makes the first channel face at least two of the flow paths so as to make at least two flow paths communicate with each other.

19 Claims, 22 Drawing Sheets

(56) References Cited

U.S. PATENT DOCUMENTS

| | | | |
|---|---|---|---|
| 5,634,352 A * | 6/1997 | Nagai et al. | 62/324.6 |
| 6,352,105 B1 * | 3/2002 | Serratto | 165/221 |
| 2004/0210162 A1 * | 10/2004 | Wyatt et al. | 600/573 |
| 2009/0127068 A1 | 5/2009 | Ikeda et al. | |

FOREIGN PATENT DOCUMENTS

| | | |
|---|---|---|
| JP | 53-040417 | 4/1978 |
| JP | 54-104033 | 8/1979 |
| JP | 61-114376 | 7/1986 |
| JP | 62-062073 | 4/1987 |
| JP | 03-033384 | 4/1991 |
| JP | 2001-330004 | 11/2001 |
| JP | 2004-027394 | 1/2004 |
| KR | 10-2009-0008896 | 1/2009 |

OTHER PUBLICATIONS

Korea Office action dated Jan. 3, 2012.
China Office action dated Jan. 10, 2012.
Japan Office action, dated Jun. 25, 2013 along with an english translation thereof.
China Office action, mail date is Aug. 14, 2013.
China Office action, mail date is Feb. 18, 2013.

* cited by examiner

VALVE DEVICE AND TEMPERATURE ADJUSTING SYSTEM FOR ELECTRONIC DEVICE

TECHNICAL FIELD

The present invention relates to a valve device adjusting flow volumes of a plurality of fluids for adjusting the temperature of an electronic device under test and a temperature adjusting system for an electronic device.

BACKGROUND ART

In the test of semiconductor integrated circuit devices and other electronic devices, it is required that the temperature of the electronic devices are held at a high temperature, ordinary temperature, or low temperature. Further, the electronic devices emit heat on their own during operation. Therefore, the electronic devices have to be adjusted in temperature.

SUMMARY OF INVENTION

Technical Problem

When using a cooling medium and heating medium to adjust the temperature of an electronic device via a heat sink, there has been the problem that, unless precisely controlling their flow volumes, the temperature of the electronic device cannot be adjusted well.

The problem to be solved by the present invention is to provide a valve device and temperature control system enabling precision control of the flow volumes of a plurality of fluids.

Solution to Problem

According to the present invention, there is provided a valve device for adjusting flow volumes of a plurality of fluids for adjusting the temperature of an electronic device under test, characterized in that the valve device comprises: a plurality of flow paths through which the fluids are able to flow; and a merging section into which the plurality of flow paths merge, the merging section has a switching member internally and a first channel is formed in the switching member, and the switching member makes the first channel face at least two flow paths among the plurality of flow paths so as to connect the at least two flow paths.

While not particularly limited to this in the above invention, preferably the first channel has an opening width reduced toward its end parts.

While not particularly limited to this in the above invention, preferably the switching member is a rotary body provided rotatably inside the merging section.

While not particularly limited to this in the above invention, preferably the rotary body is a shaft provided rotatably inside the merging section, and the first channel is formed in a circumferential surface of the shaft.

While not particularly limited to this in the above invention, preferably a second channel is formed in the rotary body at a position symmetric with respect to the first channel around its axial center of rotation.

While not particularly limited to this in the above invention, preferably the second channel has an opening width reduced toward its end parts.

While not particularly limited to this in the above invention, preferably the rotary body has a bypass path running through the rotary body.

While not particularly limited to this in the above invention, preferably the plurality of flow paths merge into the merging section radially, and the first channel, the second channel, and the bypass path are arranged substantially in parallel.

While not particularly limited to this in the above invention, preferably the plurality of flow paths include: a first flow path; a second flow path which is adjacent to the first flow path; and a third flow path which is adjacent to the second flow path, and the rotary body can rotate among a first rotary position where the first channel faces the first flow path and the second flow path, a second rotary position where the first channel faces the first flow path, the second flow path, and the third flow path, and a third rotary position where the first channel faces the second flow path and the third flow path.

While not particularly limited to this in the above invention, preferably the first flow path is a first inflow path from which the cooling medium flows in, the second flow path is an outflow path from which at least one of the cooling medium or heating medium flows out, and the third flow path is a second inflow path from which the heating medium flows in.

While not particularly limited to this in the above invention, preferably when the rotary body is at the second rotary position, the cooling medium flowing in from the first inflow path and the heating medium flowing in from the second inflow path are mixed at the outflow path.

While not particularly limited to this in the above invention, preferably the first channel has an opening width reduced toward its end parts so that flow volume of fluids flowing from the first inflow path and the second inflow path to the outflow path is substantially constant.

While not particularly limited to this in the above invention, preferably the plurality of flow paths further include: a fourth flow path; a fifth flow path which is adjacent to the fourth flow path; and a sixth flow path which is adjacent to the fifth flow path, a second channel is formed in the rotary body, when the rotary body is at the first rotary position, the second channel faces the fourth flow path and the fifth flow path, when the rotary body is at the second rotary position, the second channel faces the fourth flow path, the fifth flow path, and the sixth flow path, and when the rotary body is at the third rotary position, the second channel faces the fifth flow path and the sixth flow path.

While not particularly limited to this in the above invention, preferably the fourth flow path is a first return path returning the cooling medium, the fifth flow path is a third inflow path from which at least one of the cooling medium or heating medium flows in, and the sixth flow path is a second return path return path returning the heating medium.

While not particularly limited to this in the above invention, preferably when the rotary body is at the second rotary position, fluid flowing in from the third inflow path is divided between the first return path and the second return path.

While not particularly limited to this in the above invention, preferably the second channel has an opening width gradually reduced toward its end parts so that flow volume of fluid flowing from the third inflow path to the first return path and the second return path is substantially constant.

While not particularly limited to this in the above invention, preferably the rotary body has a bypass path running through the rotary body, when the rotary body is at the first rotary position, the bypass path connects the third flow path and the sixth flow path, and when the rotary body is at the third rotary position, the bypass path connects the first flow path and the fourth flow path.

While not particularly limited to this in the above invention, preferably the first to sixth flow paths are connected to the merging section at equal intervals.

While not particularly limited to this in the above invention, preferably the device further comprises a rotation driving means for turning the rotary body turn.

While not particularly limited to this in the above invention, preferably the switching member is a moving body provided slidably inside the merging section.

While not particularly limited to this in the above invention, preferably a second channel is formed in the moving body at a symmetric position with respect to the first channel.

While not particularly limited to this in the above invention, preferably the second channel has an opening width gradually reduced toward its end parts.

While not particularly limited to this in the above invention, preferably the moving body has a bypass path running through the moving body.

Further, according to the present invention, there is provided a temperature control system for controlling a temperature of an electronic device under test, characterized in that the temperature control system comprises: a heat sink contacting the electronic device under test; a cooling medium feeding means for feeding a cooling medium to the heat sink; a heating medium feeding means for feeding a heating medium to the heat sink; and the above valve device interposed between the heat sink and the cooling medium feeding means and between the heat sink and the heating medium feeding means.

While not particularly limited to this in the above invention, preferably the heat sink is connected to the outflow path and the third inflow path, the cooling medium feeding means is connected to the first inflow path and the first return path, and the heating medium feeding means is connected to the second inflow path and the second return path.

Advantageous Effects of Invention

In the present invention, a first channel which is formed in a switching member faces at least two flow paths so as to connect the flow paths, so the flow volumes of a plurality of fluids can be precisely controlled.

BEST MODE FOR CARRYING OUT THE INVENTION

Below, embodiments of the present invention will be explained based on the drawings.

Figure 1:
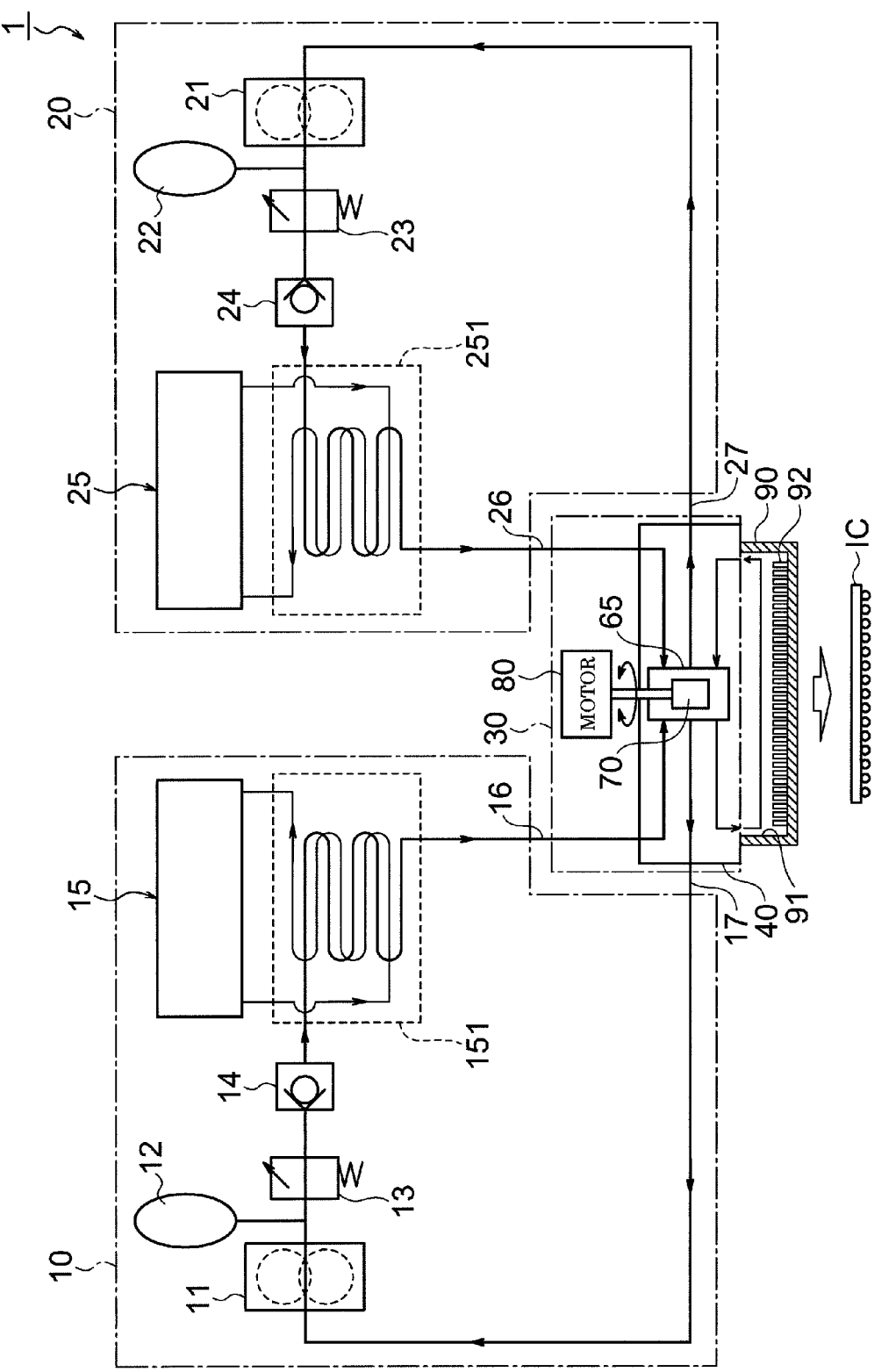
FIG. 1 is a block diagram of a temperature adjusting system for an electronic device in an embodiment of the present invention.

First, a temperature adjusting system 1 for an electronic device in which a valve device 40 according to the present embodiment is used will be explained. FIG. 1 is a block diagram of a temperature adjusting system for an electronic device in the present embodiment.

A temperature adjusting system 1 for an electronic device in the present embodiment is a system using a cooling medium and heating medium to adjust the temperature of an electronic device while a thermal chuck 30 for pushing an electronic device under test against a socket of a test head etc. contacts the electronic device. As the cooling medium and heating medium, for example, a fluorine-based inert fluid (for example, Fluorinert® made by 3M) or a water-based heat conductive fluid (for example, Dynalene HC-10 made by Dynalene Inc.) etc. may be mentioned.

This temperature adjusting system 1, as shown in FIG. 1, comprises: a cooling medium feed system 10 feeding a cooling medium to the thermal chuck 30; a heating medium feed system 20 feeding a heating medium to the thermal chuck 30; a valve device 40 provided inside the thermal chuck 30 and mixing the cooling medium and heating medium while adjusting their flow volumes (flow rates); and a heat sink 90 contacting the electronic device to exchange heat. Note that the notation IC indicates an electronic device in FIG. 1.

The cooling medium feed system 10 comprises a pump 11, accumulator 12, regulator 13, chuck valve 14, and chiller 15. In this cooling medium feed system 10, the pump 11 pumps the cooling medium so that the cooling medium circulates inside the system. Further, the cooling medium passes through a heat exchange part 151 of the chiller 15 whereby the cooling medium is cooled to a set temperature.

Also the heating medium feed system 20 comprises a pump 21, accumulator 22, regulator 23, chuck valve 24, and boiler 25. In this heating medium feed system 20 as well, the pump 21 pumps the heating medium so that the heating medium circulates inside the system. Further, the heating medium passes through a heat exchange part 251 of the boiler 25 whereby the heating medium is heated to a set temperature.

The cooling medium passed through the heat exchange part 151 of the chiller 15 is guided through the cooling medium feed pipe 16 to the valve device 40. Similarly, the heating medium passing through the heat exchange part 251 of the boiler 25 is also guided through a heating medium feed pipe 26 to the valve device 40. The valve device 40 mixes the cooling medium and heating medium while adjusting their flow volumes so that the temperature of the electronic device becomes the target temperature, and it guides the mixed solution to the heat sink 90.

A chamber 91 through which the mixed solution can flow is formed inside the heat sink 90. A large number of fins 92 are provided at the bottom surface of this chamber 91 in order to improve the cooling/heating efficiency. When the mixed solution is guided from the valve device 40 to the inside of the chamber 91, the electronic device and mixed solution exchange heat via the heat sink 90. Further, the used mixed solution is returned from the heat sink 90 to the valve device 40, and it returns to the cooling medium feed system 10 and heating medium feed system 20 via the recovery pipes 17, 27.

Figure 2:
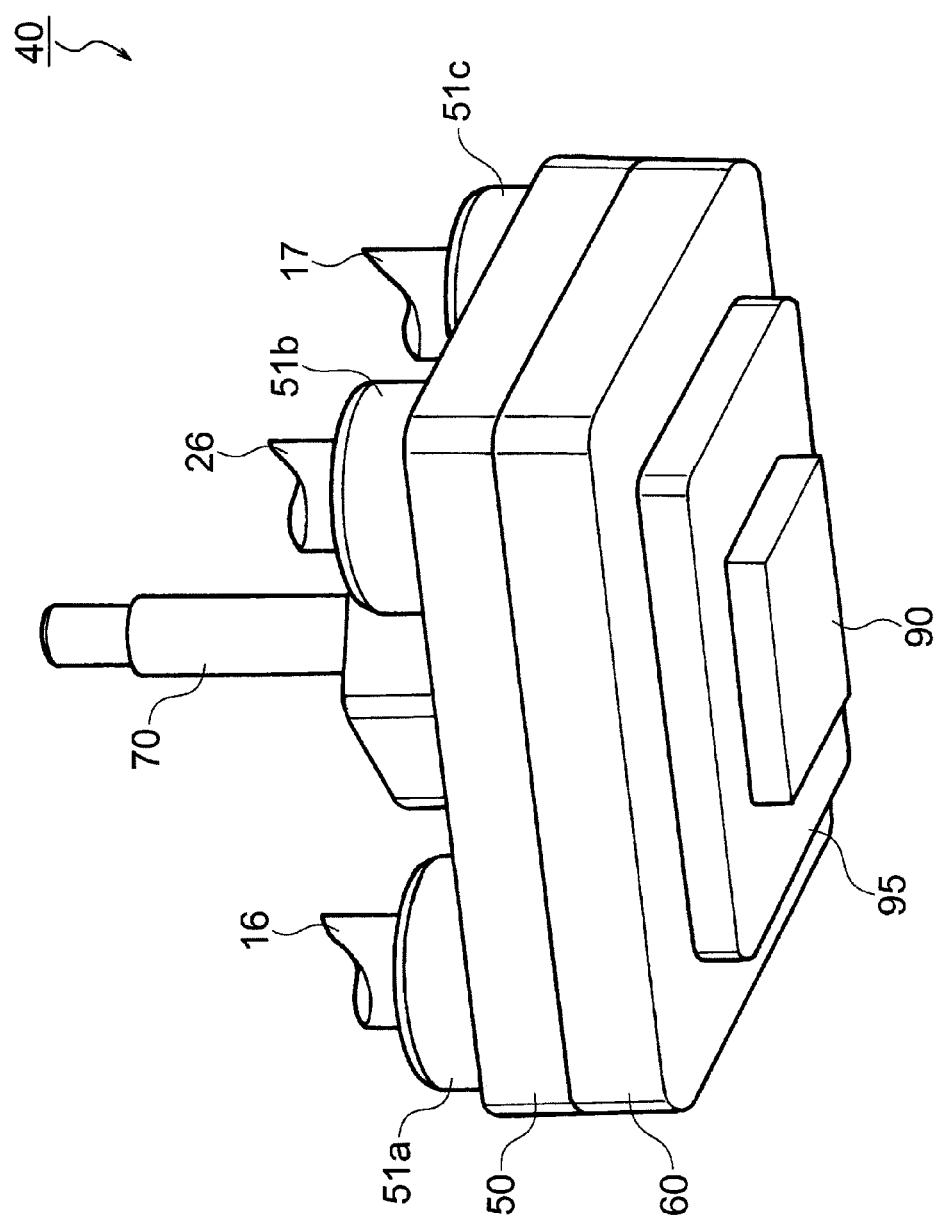
FIG. 2 is a perspective view of a valve device of an embodiment of the present invention seen from below.
Figure 3:
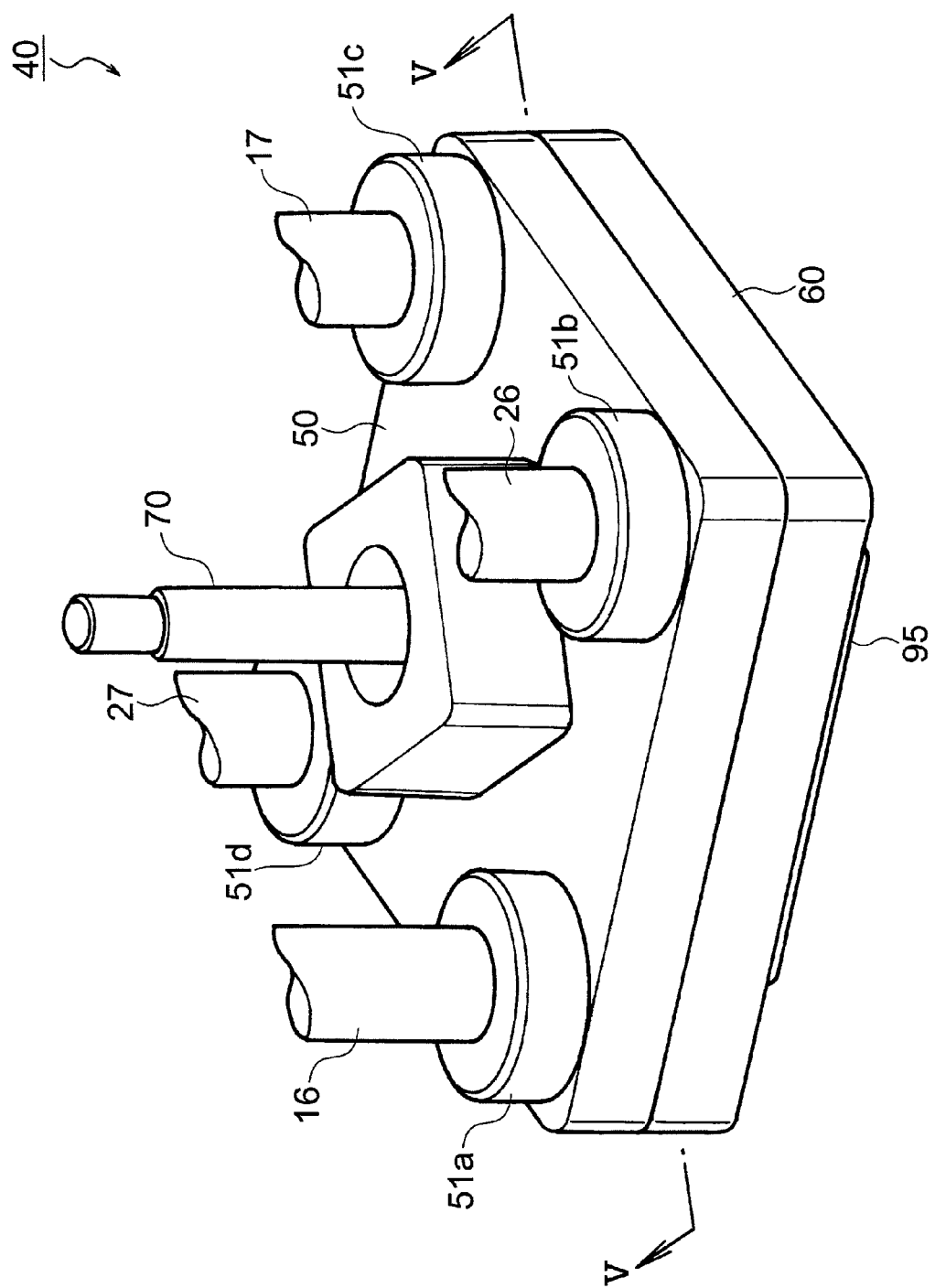
FIG. 3 is a perspective view of the valve device of an embodiment of the present invention seen from above.
Figure 4:
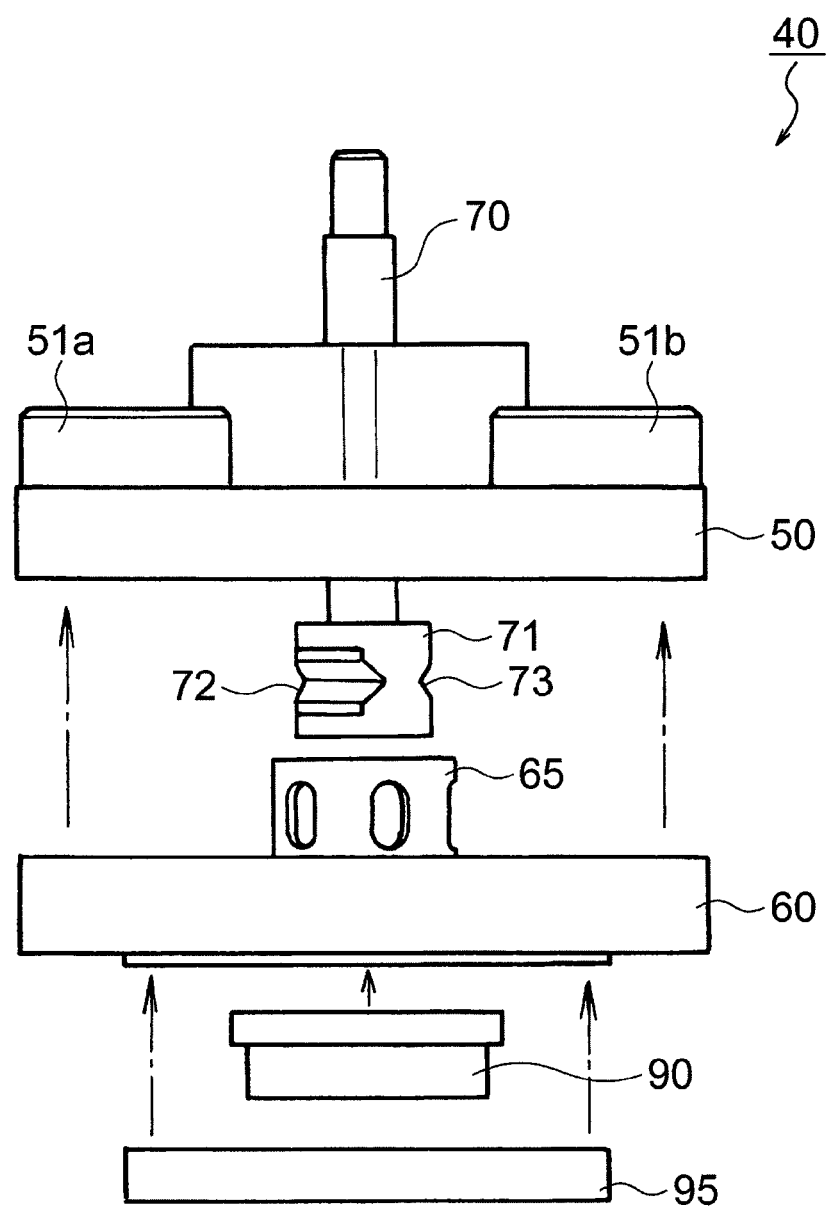
FIG. 4 is a disassembled side view of the valve device shown in FIG. 2 and FIG. 3.
Figure 5:
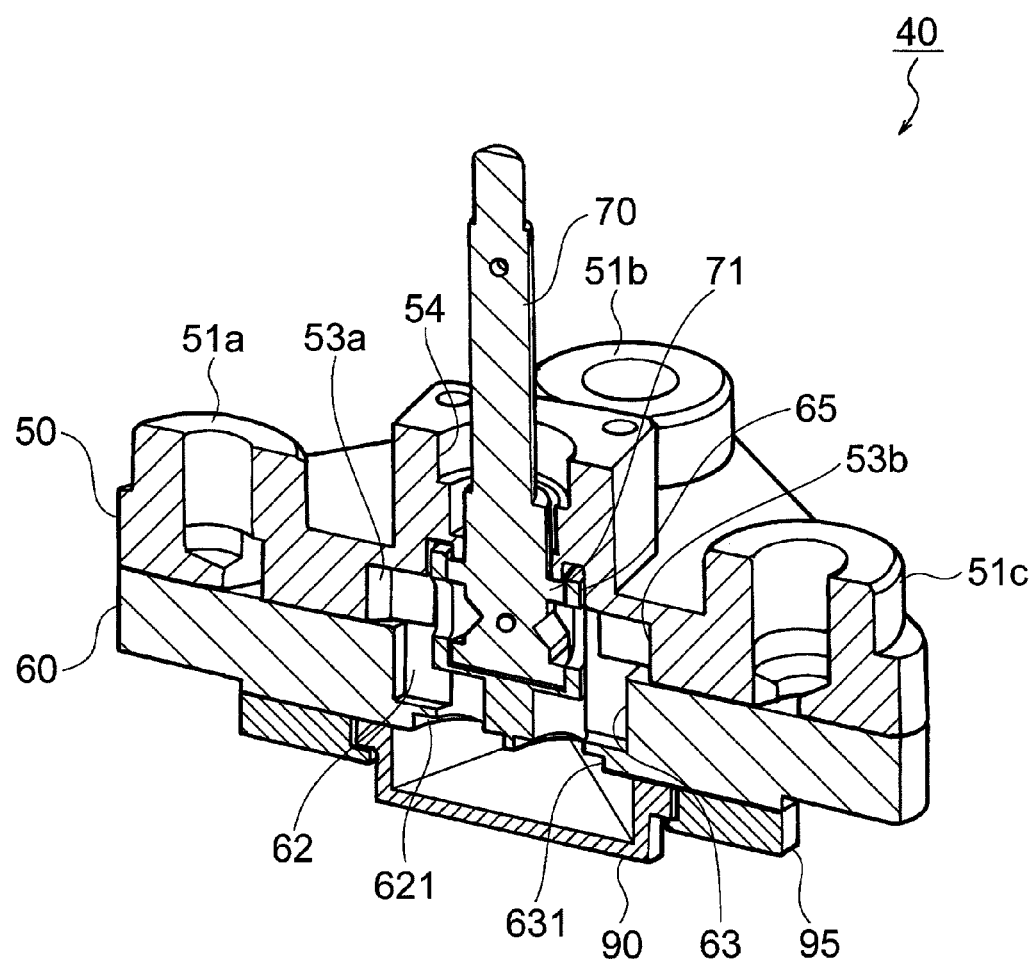
FIG. 5 is a cross-sectional perspective view along the line V-V of FIG. 3.

Next, the structure of the valve device 40 in the present embodiment will be explained. FIG. 2 and FIG. 3 are perspective views of the valve device of the present embodiment, FIG. 4 is a disassembled side view of the valve device, and FIG. 5 is a cross-sectional perspective view along the line V-V of FIG. 3.

The valve device 40, as shown in FIG. 2 to FIG. 5, comprises: an upper member 50 to which pipes 16, 17, 26, 27 of the cooling medium feed system 10 and heating medium feed system 20 are connected; a lower member 60 to which the heat sink 90 is attached; a valve shaft 70 rotatably inserted in the upper member 50; and a motor 80 for turning the valve shaft 70 to a predetermined angle (see FIG. 1).

Figure 6:
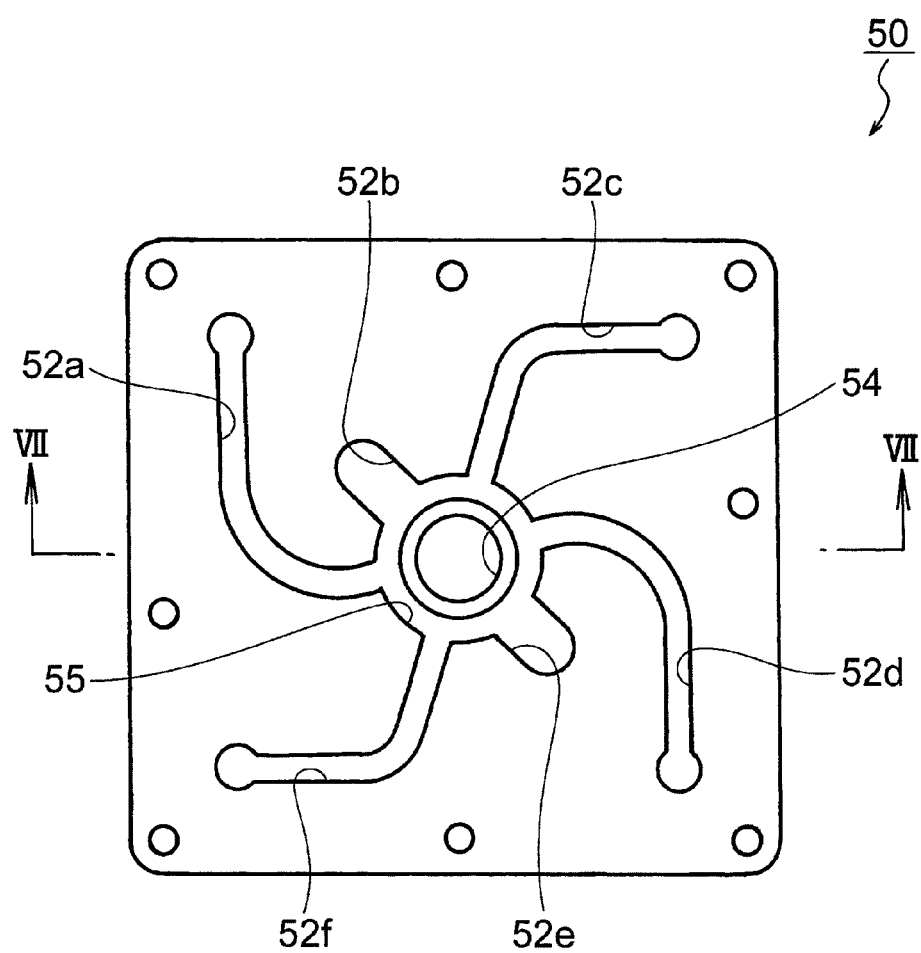
FIG. 6 is a back view of an upper member of the valve device shown in FIG. 2 and FIG. 3.
Figure 7:
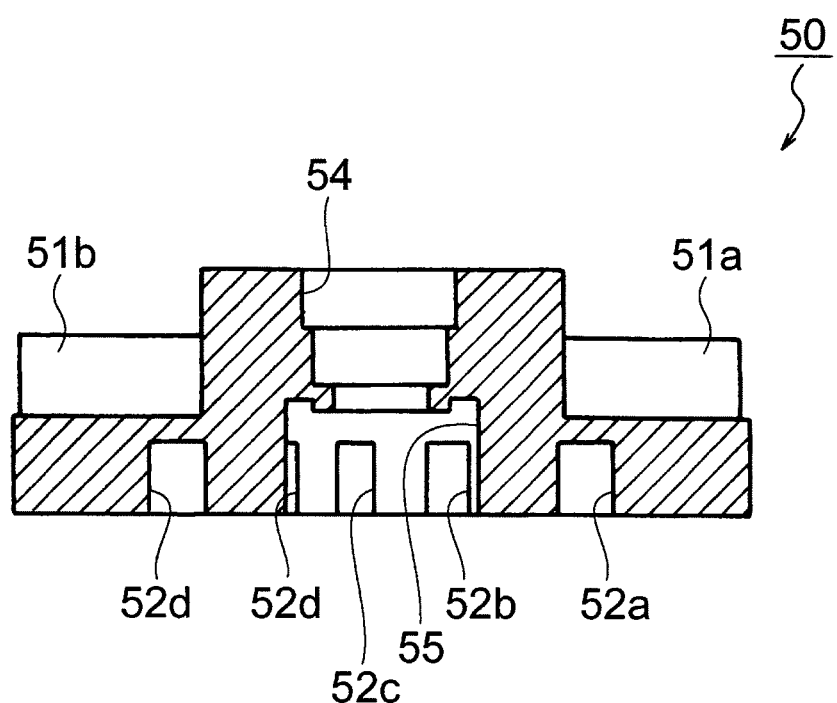
FIG. 7 is a cross-sectional view along the line VII-VII of FIG. 6.

FIG. 6 is a back view of an upper member of the valve device, and FIG. 7 is a cross-sectional view along the line VII-VII of FIG. 6.

As shown in FIG. 3, a through hole 54 is formed in the upper member 50 at its approximate center, and four connection ports 51a to 51d are formed in the upper member 50 at the four corners of its top surface.

The first connection port 51a is connected to the cooling medium feed pipe 16 of the cooling medium feed system 10, while the second connection port 51b is connected to the heating medium feed pipe 26 of the heating medium feed system 20. On the other hand, the third connection port 51c is connected to the cooling medium recovery pipe 17 of the cooling medium feed system 10, while the fourth connection port 51d is connected to the heating medium recovery pipe 27 of the heating medium feed system 20.

Further, as shown in FIG. 6, six flow paths 52a to 52f are formed at the bottom surface of the upper member 50.

The first and second inflow paths 52a, 52c are both channels bent into bow shapes from the corners to the center at the bottom surface of the upper member 50. One end of the first inflow path 52a is connected to the first connection port 51a and cooling medium flows in from the cooling medium feed system 10. On the other hand, one end of the second inflow path 52c is connected to the second connection port 51b and heating medium flows in from the heating medium feed system 20.

As opposed to this, the outflow path 52b, unlike the first and second inflow paths 52a, 52c, is a channel extending straight and short at the bottom surface of the upper member 50. One end of this outflow path 52b is connected to a first communicating hole 62 (explained later) of the lower member 60, and cooling medium and heating medium flowing in through the first and second inflow paths 52a, 52c flow out to the chamber 91 of the heat sink 90. This outflow path 52b is arranged between the first inflow path 52a and the second inflow path 52c.

The third inflow path 52e, like the outflow path 52b, is also a channel extending straight and short at the bottom surface of the upper member 50. One end of this third inflow path 52e is connected to a second communicating hole 63 (explained later) of the lower member 60, and the used mixed solution flows in from the chamber 91 of the heat sink 90.

As opposed to this, the first and second return paths 52d, 52f both, in the same way as the first and second inflow paths 52a, 52c, are channels bent into bow shapes from corners toward the center at the bottom surface of the upper member 50. One end of the first return path 52d is connected with the third connection port 51c, while one end of the second return path 52f is connected to the fourth connection port 51d. The used mixed solution is returned through the first and second return paths 52d, 52f to the cooling medium feed system 10 and the heating medium feed system 20.

These six flow paths 52a to 52f, as shown in FIG. 6 and FIG. 7, radially merge into the large-diameter part 55 of the through hole 54 at substantially equal intervals. Further, the first inflow path 52a and the first return path 52d are arranged symmetrically around the through hole 54. Similarly, the outflow path 52b and the third inflow path 52e are arranged symmetrically around the through hole 54, while the second inflow path 52c and the second return path 52f are arranged symmetrically around the through hole 54.

Figure 8:
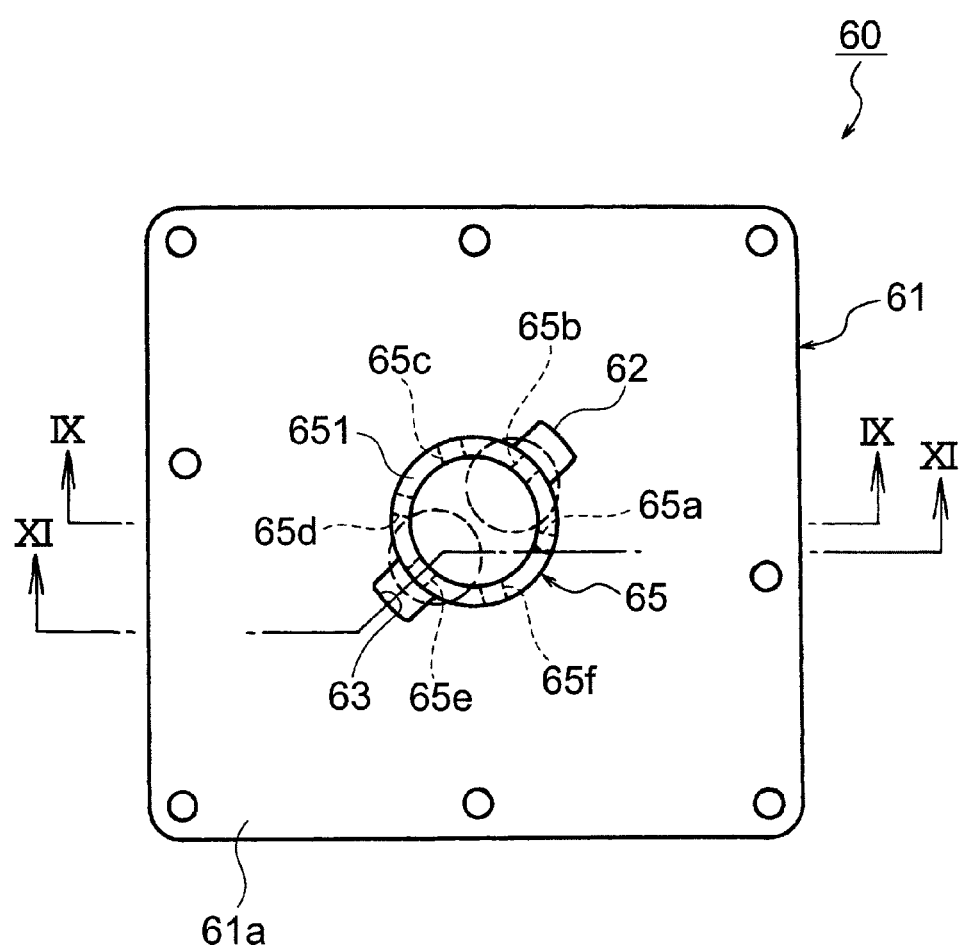
FIG. 8 is a plan view of a lower member of the valve device shown in FIG. 2 and FIG. 3.
Figure 9:
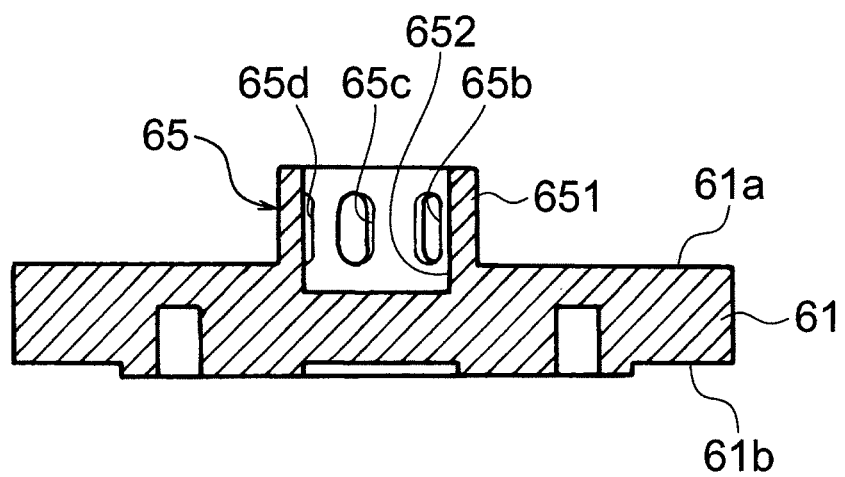
FIG. 9 is a cross-sectional view along the line IX-IX of FIG. 8.
Figure 10:
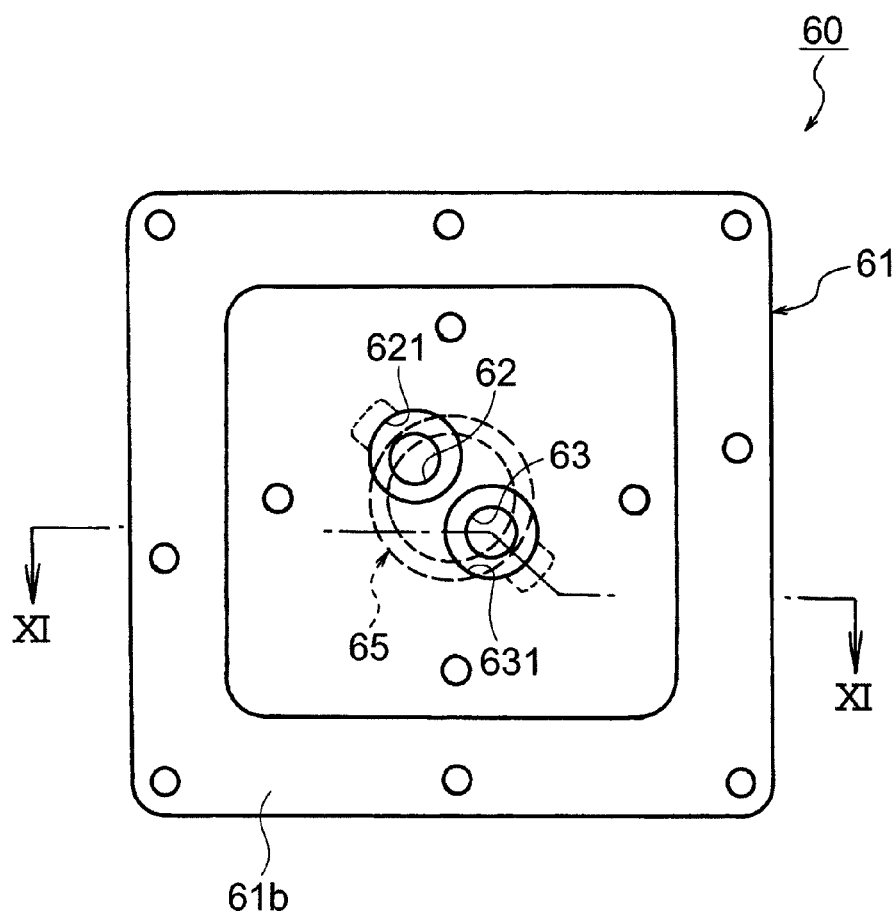
FIG. 10 is a back view of the lower member shown in FIG. 8.
Figure 11:
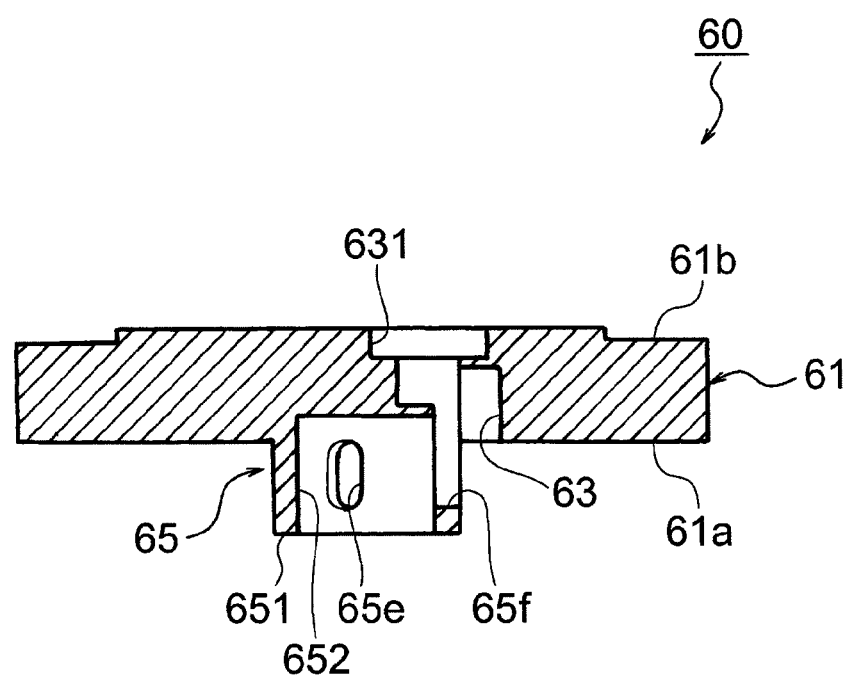
FIG. 11 is a cross-sectional view along the line XI-XI of FIG. 8 and FIG. 10.

FIG. 8 is a plan view of a lower member of the valve device, FIG. 9 is a cross-sectional view along the line IX-IX of FIG. 8, FIG. 10 is a back view of a lower member shown in FIG. 8, and FIG. 11 is a cross-sectional view along the line XI-XI of FIG. 8 and FIG. 10.

The lower member 60, as shown in FIG. 8 to FIG. 11, comprises: a substantially flat plate base part 61; and a cylindrical merging section 65 sticking out from the substantial center of the base part 61.

The merging section 65, as shown in FIG. 8 and FIG. 9, has a cylindrical wall 651 able to be inserted into a large-diameter part 55 of a through hole 54 of the upper member 50. Six openings 65a to 65f are formed in this cylindrical wall 651 at substantially equal intervals. Note that a large-diameter part 71 of a valve shaft 70 explained later is inserted into an inside hole 652 of this merging section 65.

When assembling the upper member 50 and the lower member 60, the first opening 65a faces the first inflow path 52a. Similarly, the second opening 65b faces the outflow path 52b, the third opening 65c faces the second inflow path 52c, the fourth opening 65d faces the first return path 52d, the fifth opening 65e faces the third inflow path 52e, and the sixth opening 65f faces the second return path 52f.

Furthermore, as shown in FIG. 8, in the base part 61, a first communicating hole 62 is formed near the second opening 65b of the merging section, while a second communicating hole 63 is formed near a fifth opening 65e of the merging section 65. Note that, when assembling the upper member 50 and the lower member 60, the second opening 65b and the first communicating hole 62 communicate through the outflow path 52b. Also the fourth opening 65d and the second communicating hole 63 communicate through the third inflow path 52e.

As shown in FIG. 11, the second communicating hole 63 runs through the base part 61 from its front surface 61a to its back surface 61b and opens at the second opening 622 in the back surface 61b. While not particularly shown, the first communicating hole 62 similarly runs through the base part 61 from the front surface 61a to the back surface 61b and opens at the first opening 621 in the back surface 61b. While the heat sink 90 is attached to the back surface 61b of this base part 61 by a holding member 95, the first opening 621 functions as an inlet to the chamber 91 of the heat sink 90 and the second opening 622 functions as an outlet from the chamber 91.

Figure 12:
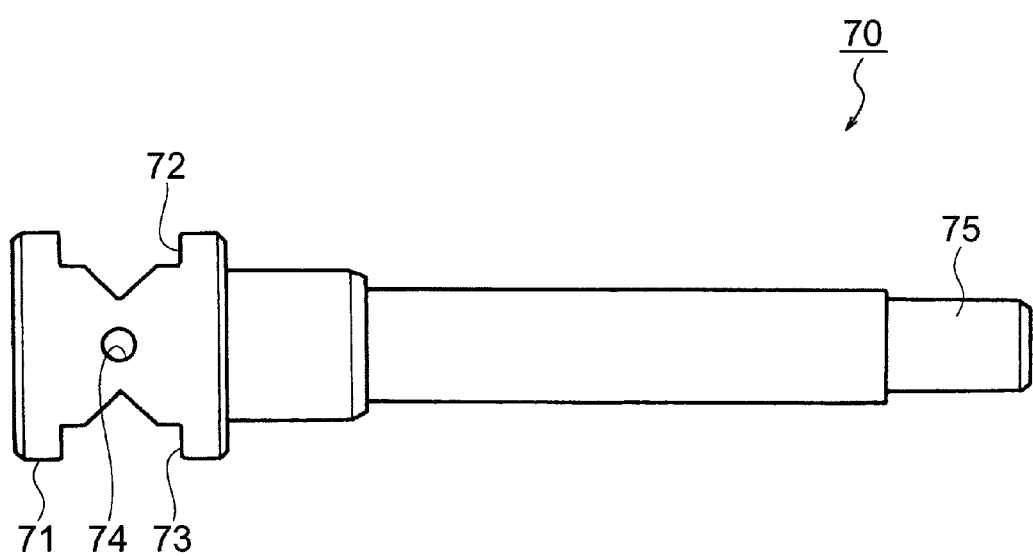
FIG. 12 is a side view showing a valve shaft of the valve device shown in FIG. 2 and FIG. 3.
Figure 13:
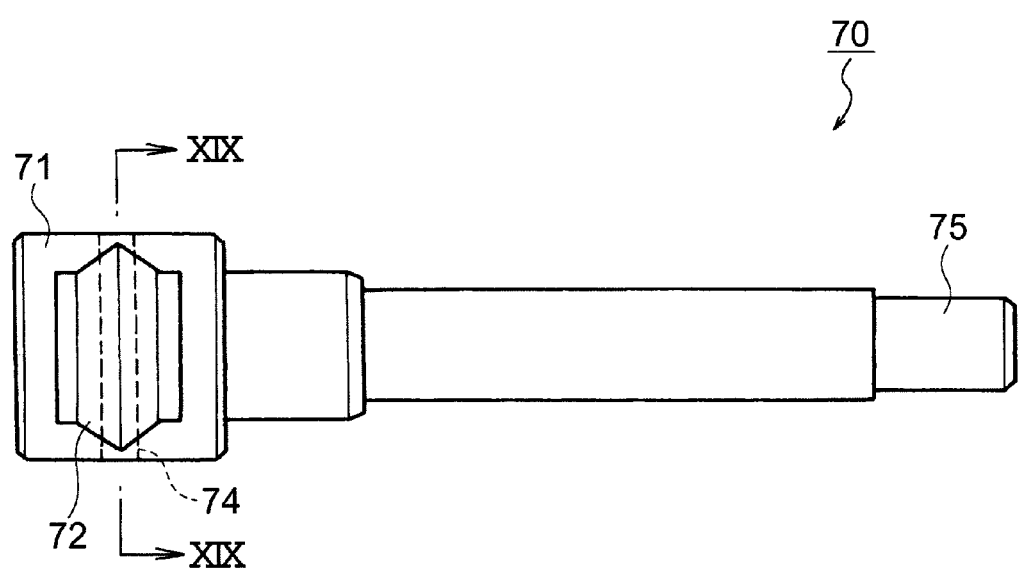
FIG. 13 is a front view of a valve shaft shown in FIG. 12.
Figure 14:
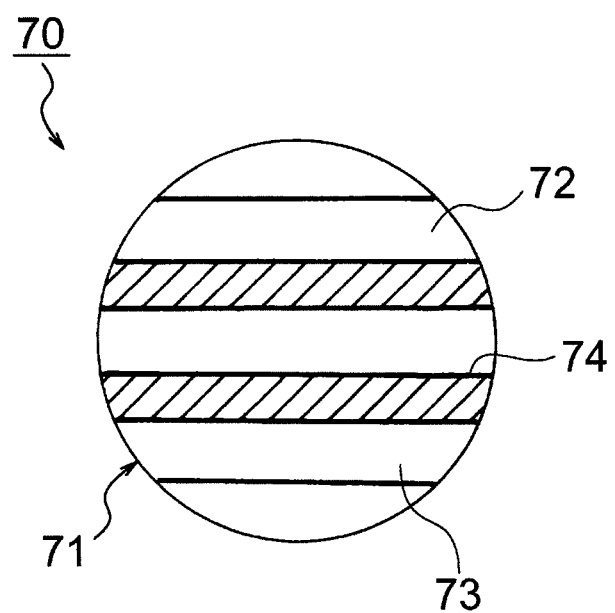
FIG. 14 is a cross-sectional view along the line XIX-XIX of FIG. 13.
Figure 16:
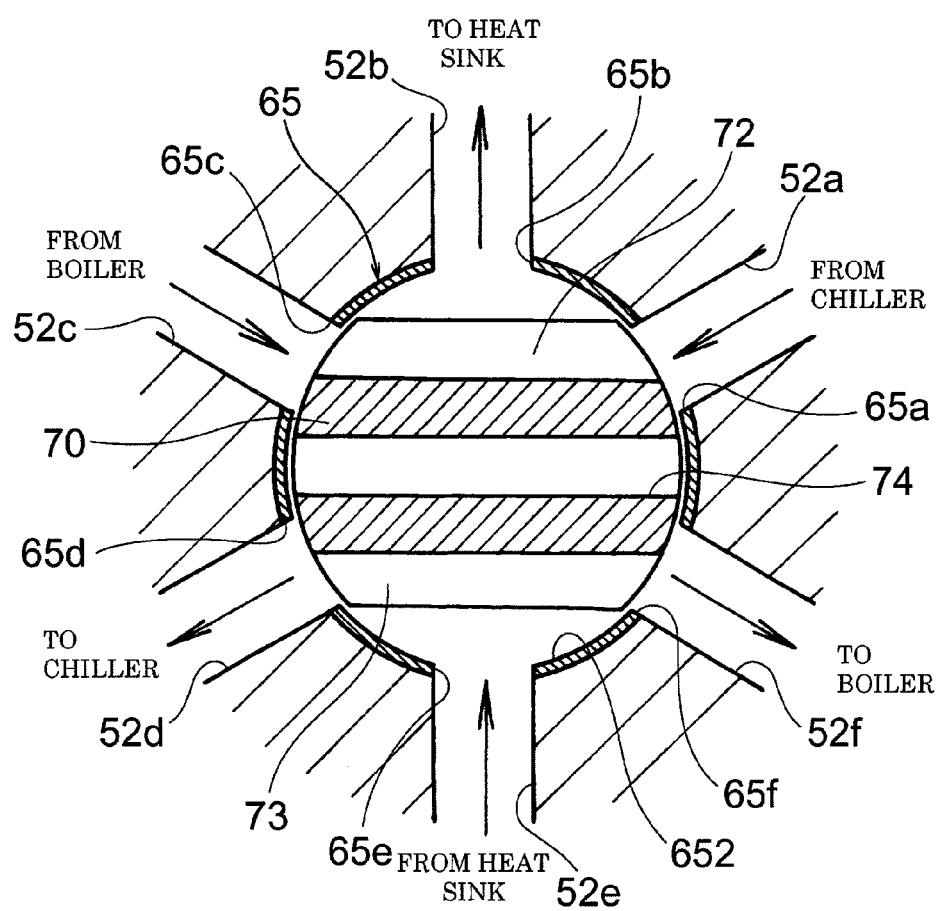
FIG. 16 is a schematic cross-sectional view showing the valve shaft in a second rotary position in an embodiment of the present invention.
Figure 17:
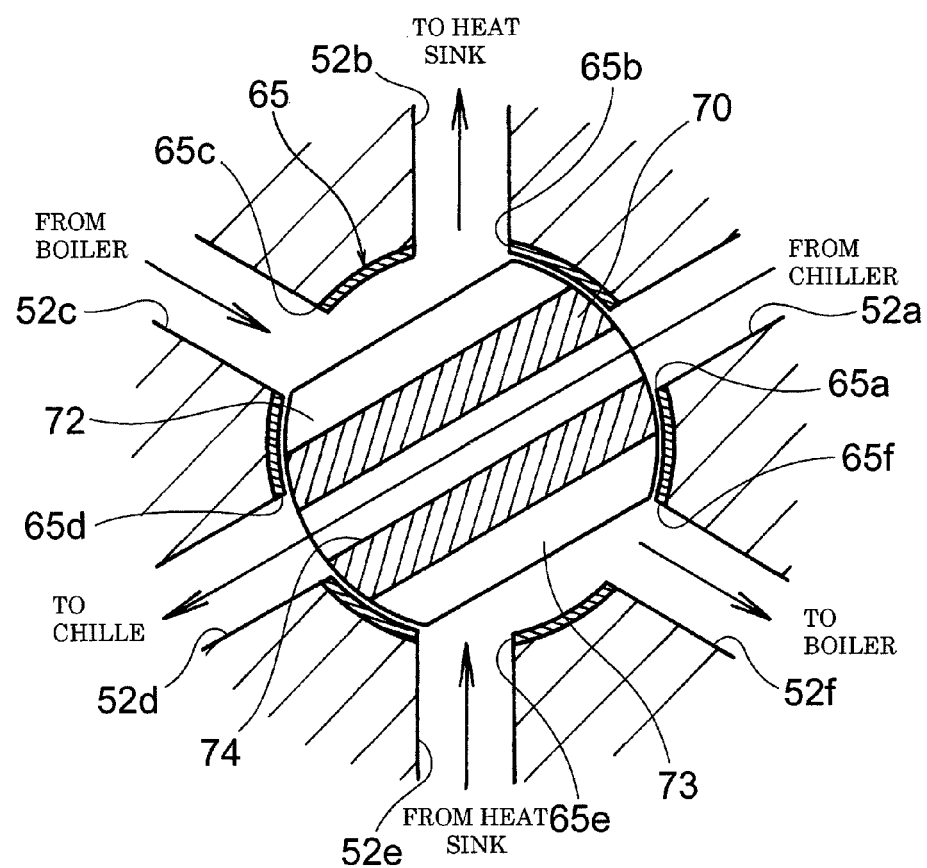
FIG. 17 is a schematic cross-sectional view showing the valve shaft in a third rotary position in an embodiment of the present invention.
Figure 18:
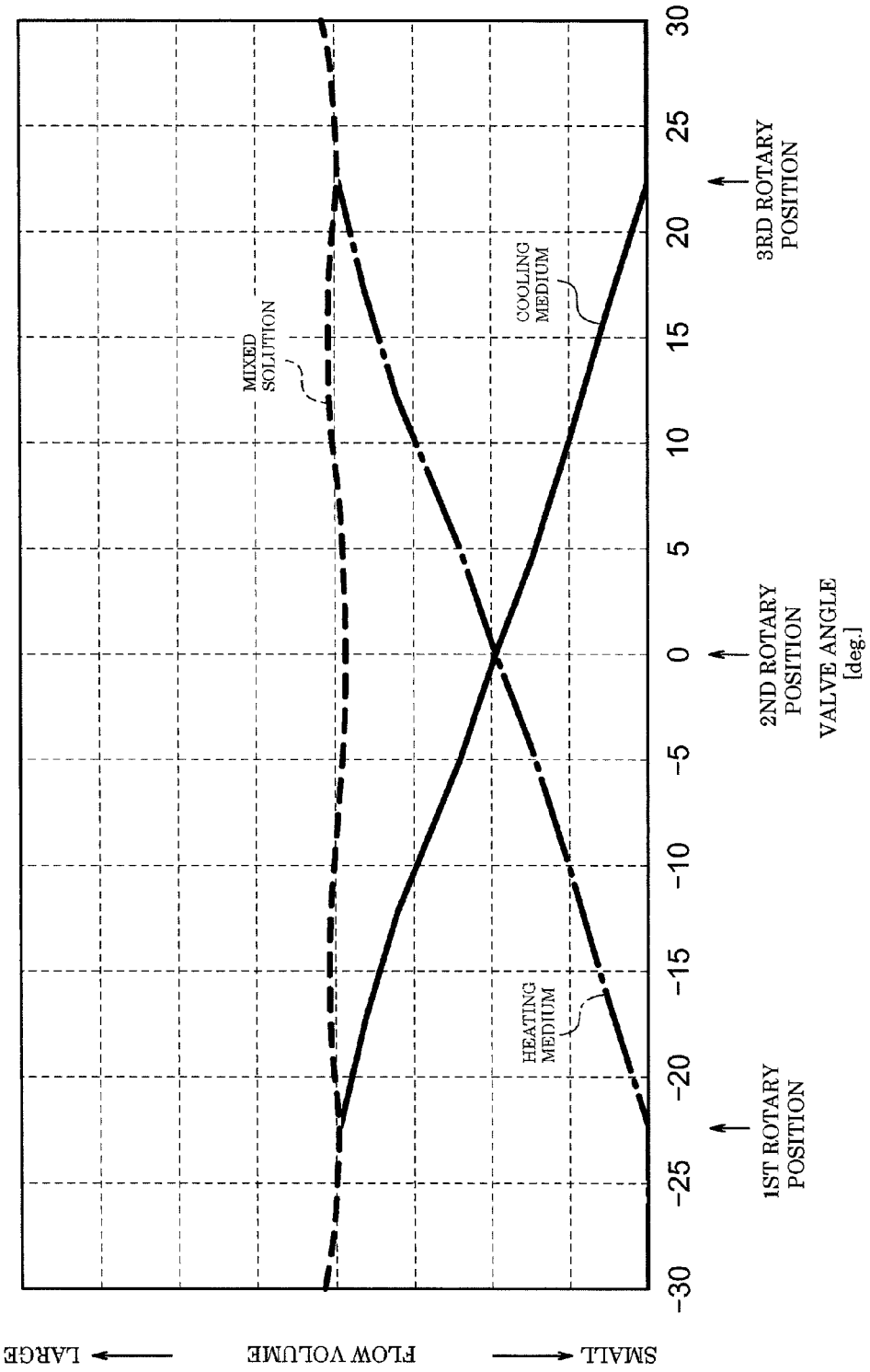
FIG. 18 is a graph showing the relationship between an angle of the valve shaft of a valve device and a flow volume of a fluid in an embodiment of the present embodiment.

FIG. 12 is a side view showing a valve shaft of the valve device, FIG. 13 is a front view of a valve shaft shown in FIG. 12, FIG. 14 is a cross-sectional view along the line XIX-XIX of FIG. 13, FIG. 15 to FIG. 17 are schematic cross-sectional views showing a valve shaft in first to third rotary positions, and FIG. 18 is a graph showing the relationship between an angle of a valve shaft of a valve device and a flow volume of a fluid in the present embodiment.

The valve shaft 70, as shown in FIG. 12 and FIG. 13, has a large-diameter part 71 at one end and a small-diameter part 75 at the other end. This small-diameter part 75 is connected to a drive shaft of a motor 80 (see FIG. 1) for turning the valve shaft 70 to a predetermined angle.

As shown in FIG. 12 to FIG. 14, a first channel 72 and a second channel 73 are formed at the circumferential surface of the large-diameter part 71. The first channel 72 and the second channel 73 are formed at symmetric positions around an axial center of rotation of the valve shaft 70. As shown in FIG. 13, the opening width of the first channel 72 gradually narrows toward the both ends along the circumferential direction. Similarly, while not particularly illustrated, the opening width of the second channel 73 gradually narrows toward the both ends along the circumferential direction.

Further, as shown in FIG. 14, a bypass path 74 runs inside the large-diameter part 71 of the valve shaft 70. This bypass path 74 is formed between the first channel 72 and the second channel 73 and is arranged substantially parallel to the first and second channels 71, 72.

This valve shaft 70, as shown in FIG. 4 and FIG. 5, is inserted from the large-diameter part 55 of the through hole 54 of the upper member 50. The small-diameter part 75 of the valve shaft 70 sticks out from the top surface of the upper member 50. Further, when the lower member 60 is assembled with the upper member 50, the large-diameter part 71 of the valve shaft 70 is held inside the inner hole 652 of the merging section 65 of the lower member 60.

Figure 15:
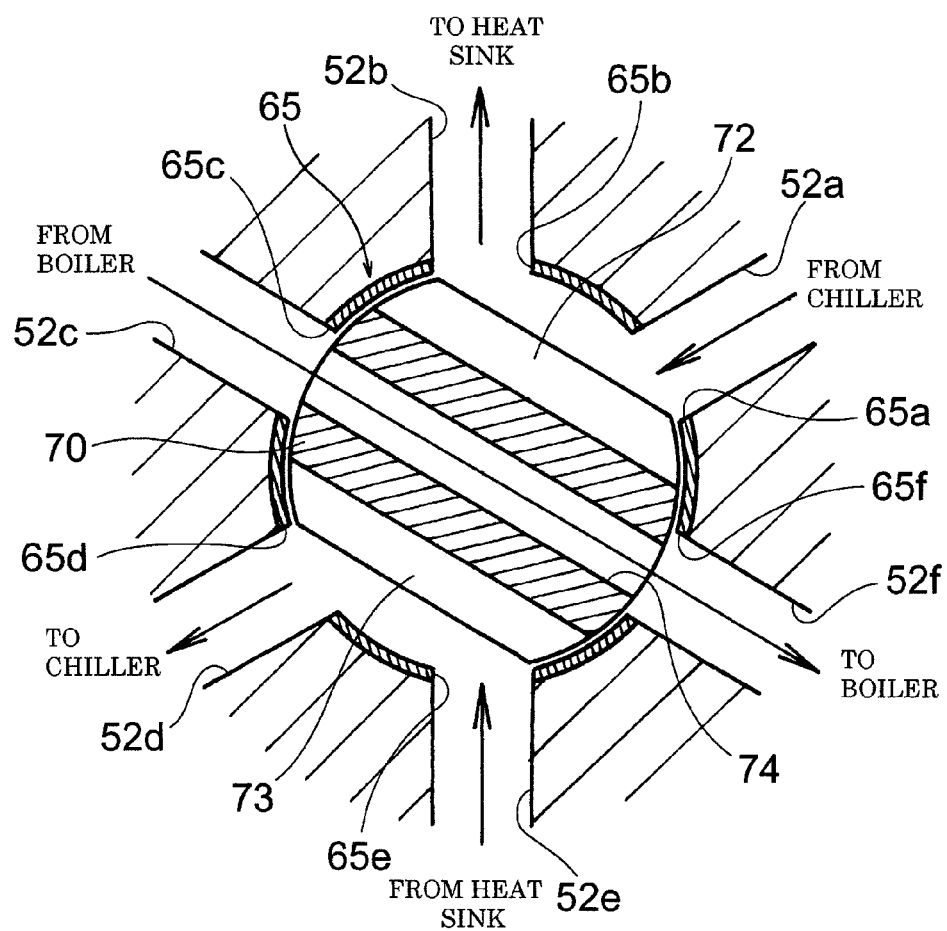
FIG. 15 is a schematic cross-sectional view showing the valve shaft in a first rotary position in an embodiment of the present invention.

The large-diameter part 71 of the valve shaft 70 is held rotatably inside the merging section 65 and is designed to be able to continuously rotate to the first to third positions shown in FIG. 15 to FIG. 17 by the drive of the motor 80.

At the first rotary position shown in FIG. 15, the first channel 72 of the valve shaft 70 faces the first inflow path 52a and outflow path 52b, the second channel 73 faces the first return path 52d and third inflow path 52e, and the second inflow path 52c and second return path 52f are communicated through the bypass path 74.

At this first rotary position, the first inflow path 52a and the outflow path 52b are communicated through the first channel 72, so the mixed solution fed to the chamber 91 of the heat sink 90 consists of only the cooling medium fed from the cooling medium feed system 10. Similarly, the first return path 52d and the third inflow path 52e are communicated through the second channel 73, so the used mixed solution flowing in from the heat sink 90 is returned to the cooling medium feed system 10 in full.

On the other hand, the heating medium fed from the heating medium feed system 20 is not fed to the heat sink 90 at all and is returned through the bypass path 74 and second return path 52f to the heating medium feed system 20 in full. Due to this bypass path 74, leakage of the heating medium due to pressure can be suppressed and a drop in temperature of the heating medium due to stagnant flow can be suppressed.

At the second rotary position shown in FIG. 16, the first channel 72 of the valve shaft 70 faces the first inflow path 52a, outflow path 52b, and second inflow path 52c, while the second channel 73 faces the first return path 52d, third inflow path 52e, and second return path 52f. Note that the bypass path 74 does not face any flow path at this second rotary position.

At this second rotary position, the first inflow path 52a, outflow path 52b, and second inflow path 52c are communicated through the first channel 72, so the cooling medium fed through the first inflow path 52a from the cooling medium feed system 10 and the heating medium fed through the second inflow path 52c from the heating medium feed system 20 are mixed at the merging section 65, then the mixed solution flows out through the outflow path 52b into the chamber 91 of the heat sink 90. The ratio of the cooling medium and heating medium forming this mixed solution is 50:50.

Similarly, at this second rotary position, the first return path 52d, third inflow path 52e, and second return path 52f are communicated through the second channel 73, so the mixed solution flowing in through the third inflow path 52e to the merging section 65 is returned through the first and second return paths 52d, 52f to the cooling medium feed system 10 and the heating medium feed system 20 in a divided fashion. The divided ratio of the mixed solution at this time is also 50:50.

At the third rotary position shown in FIG. 17, the first channel 72 of the valve shaft 70 faces the outflow path 52b and the second inflow path 52c, the second channel 73 faces the third inflow path 52e and second return path 52f, and the first inflow path 52a and the first return path 52d are communicated through the bypass path 74.

At this third rotary position, the outflow path 52b and the second inflow path 52c are communicated through the first channel 72, so the mixed solution fed to the chamber 91 of the heat sink 90 consists of only the heating medium fed from the heating medium feed system 20. Similarly, the third inflow path 52e and the second return path 52f are communicated through the second channel 73, so the used mixed solution flowing in from the heat sink 90 is returned to the heating medium feed system 20 in full.

On the other hand, the cooling medium fed from the cooling medium feed system 10 is not fed to the heat sink 90 at all and is returned through the bypass path 74 and first return path 52d to the cooling medium feed system 10 in full. Due to this bypass path 74, leakage of the cooling medium due to pressure can be suppressed and a rise in temperature of the cooling medium due to stagnant flow can be suppressed.

In the present embodiment, the opening width of the first channel 72 is gradually reduced at its ends. Due to this, when turning the valve shaft 70 from the second rotary position to the first rotary position, as shown in FIG. 18, the flow volume of the cooling medium flowing in from the first inflow path 52a continuously increases, and the flow volume of the heating medium flowing in from the second inflow path 52c continuously decreases. As a result, the flow volume of the mixed solution fed through the outflow path 52b to the heat sink 90 is substantially constant. Note that, the abscissa in FIG. 18 shows the relative angle of the valve shaft 70 with respect to the merging section 65.

Similarly, the opening of the second channel 73 is gradually reduced at its ends. Due to this, when turning the valve shaft 70 from the second rotary position to the first rotary position, while not particularly illustrated, the flow volume of the mixed solution flowing out to the first return path 52d continuously increases, and the flow volume of the mixed solution flowing out to the second return path 52f continuously decreases. As a result, the flow volume of the mixed solution flowing in through the third inflow path 52e from the heat sink 90 is substantially constant at all times.

Conversely, even when turning the valve shaft 70 from the first rotary position to the second rotary position, as shown in FIG. 18, the flow volume of the cooling medium continuously decreases, and the flow volume of the heating medium continuously increases. As a result, the flow volume of the mixed solution fed to the heat sink 90 is substantially constant at all times. Further, the flow volume of the mixed solution flowing out to the first return path 52d continuously decreases, and the flow volume of the mixed solution flowing out to the second return path 52f continuously increases. As a result, the flow volume of the mixed solution flowing in through the third inflow path 52e from the heat sink 90 is substantially constant at all times.

When turning the valve shaft 70 from the second rotary position to the third rotary position as well, since the opening width of the first channel 72 gradually decreases at its ends, as shown in FIG. 18, the flow volume of the cooling medium flowing in from the first inflow path 52a continuously decreases, and the flow volume of the heating medium flowing in from the second inflow path 52c continuously increases. As a result, the flow volume of the mixed solution fed through the outflow path 52b to the heat sink 90 is substantially constant.

Similarly, since the opening width of the second channel 73 gradually decreases at its ends, when turning the valve shaft 70 from the second rotary position to the third rotary position as well, while not particularly illustrated, the flow volume of the mixed solution flowing out to the first return path 52d continuously decreases, and the flow volume of the mixed solution flowing out to the second return path 52f continuously increases. As a result, the flow volume of the mixed solution flowing in through the third inflow path 52e from the heat sink 90 is substantially constant.

Conversely, when turning the valve shaft 70 turn from the third rotary position to the second rotary position as well, as shown in FIG. 18, the flow volume of the cooling medium continuously increases, and the flow volume of the heating medium continuously decreases. As a result, the flow volume of the mixed solution fed to the heat sink 90 is substantially constant at all times. Further, the flow volume of the mixed solution flowing out to the first return path 52d continuously increases, and the flow volume of the mixed solution flowing out to the second return path 52f continuously decreases. As a result, the flow volume of the mixed solution flowing in through the third inflow path 52e from the heat sink 90 is substantially constant.

In the above way, in the present embodiment, the first channel 72 formed in the valve shaft 70 faces at least two flow paths 52a to 52c so as to communicate these flow paths 52a to 52c, so the flow volumes of the cooling medium and the heating medium can be precisely controlled and good temperature control of the electronic device can be performed.

Figure 19:
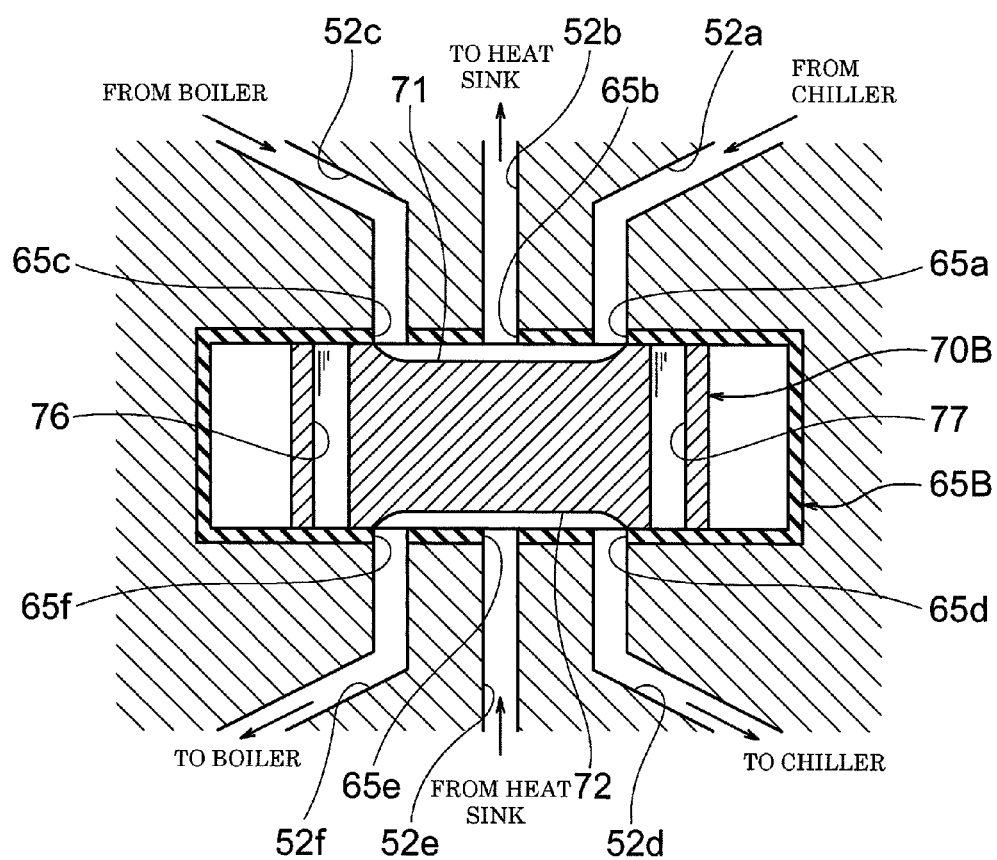
FIG. 19 is a schematic plan view showing a valve device in another embodiment of the present invention.
Figure 20:
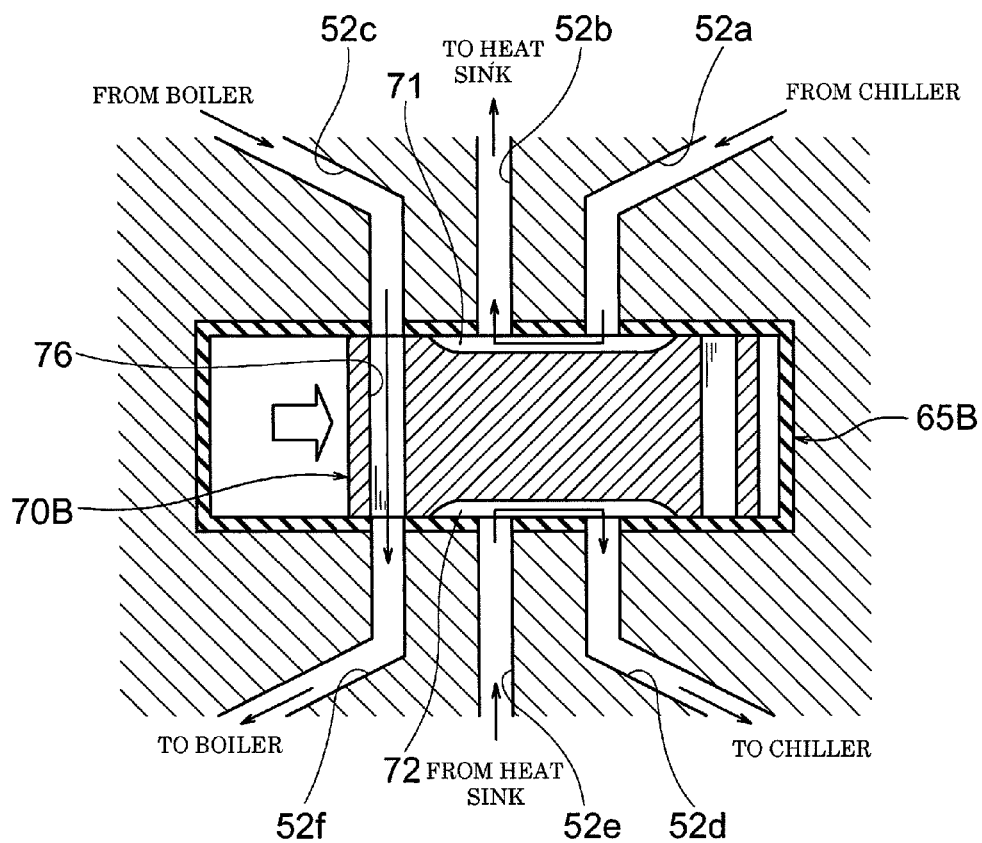
FIG. 20 is a schematic cross-sectional view of a slider block slid to one side in the valve device shown in FIG. 19.

Note that, instead of the valve shaft 70, a block shaped valve block 70B may also be used to configure the valve device. FIG. 19 to FIG. 20 are schematic cross-sectional views showing a valve device of another embodiment of the present invention, while FIG. 21 is a side view showing a block used in this valve device.

Figure 21:
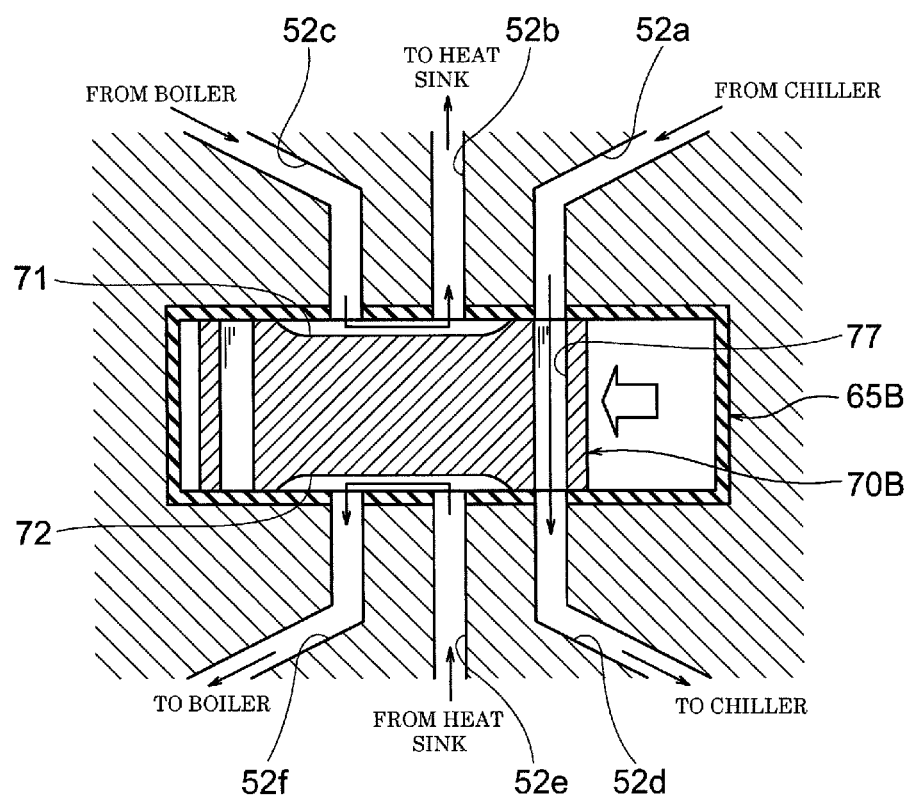
FIG. 21 is a schematic cross-sectional view of the slider block slid to the other side in the valve device shown in FIG. 19.

This valve block 70B, as shown in FIG. 19 to FIG. 21, is provided inside the merging section 65B and is designed to be able to slide by a not particularly shown actuator.

Figure 22:
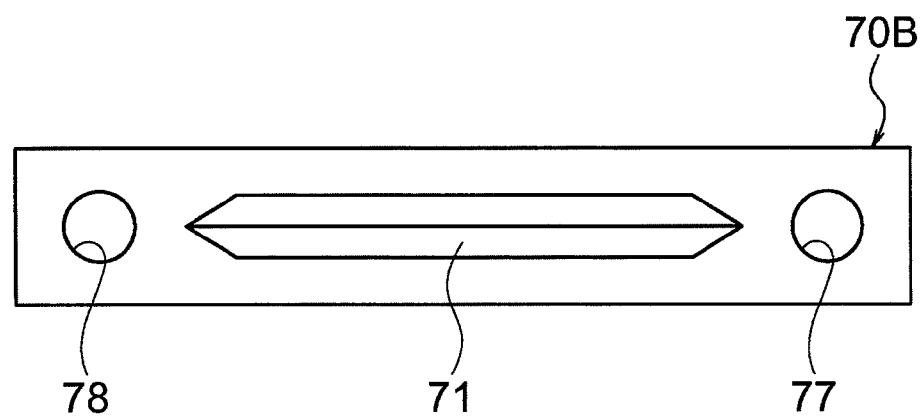
FIG. 22 is a side view showing a valve block of the valve device shown in FIG. 19.

As shown in FIG. 22, the first channel 71 is formed in one side surface of this valve block 70B. In the same way as the first embodiment, the opening width of the first channel 71 is gradually reduced at its ends. As shown in FIG. 19 to FIG. 21, a second channel 72 is also in the other side surface of the valve block 70B at a position symmetric with respect to the first channel 71. While not particularly illustrated, the opening width of the second channel 72 is also gradually reduced at its ends. Further the first and second bypass paths 76, 77 penetrate near the first and second channels 71, 72.

When the cooling medium and the heating medium are mixed in a ratio of 50:50 and supplied to the heat sink 90 by the valve device, as shown in FIG. 19, the valve block 70B is positioned at the substantial center in the merging section 65B. In this state, the first channel 71 faces the first inflow path 52a, outflow path 52b, and second inflow path 52c, while the second channel 72 faces the first return path 52d, third inflow path 52e, and second return path 52f.

As opposed to this, when supplying only the cooling medium to the heat sink 90, as shown in FIG. 20, the valve block 70B slides inside the merging section 65B to the right side in the figure, the first channel 71 faces the first inflow path 52a and outflow path 52b, and the second channel 72 faces the first return path 52d and third inflow path 52e. At this time, the second inflow path 52c and the second return path 52f are communicated through the first bypass path 76, so leakage and drop of temperature of the heating medium can be suppressed.

Further, when the valve device supplies only the heating medium to the heat sink 90, as shown in FIG. 21, the valve block 70B slides inside the merging section 65B to the left side in the figure, the first channel 71 faces the outflow path 52b and second inflow path 52c, and the second channel 72 faces the third inflow path 52e and the second return path 52f. At this time, the first inflow path 52a and the first return path 52d are communicated through the second bypass path 77, so leakage and rise of temperature of the cooling medium can be suppressed.

In the valve device comprising the valve block 70B explained above, by sliding the valve block 70B inside the merging section 65B, the mixing ratio of the cooling medium and the heating medium can be continuously changed.

Note that the above-explained embodiments were described in order to facilitate understanding of the present invention and were not described in order to limit the present invention. Therefore, the elements disclosed in the above embodiments include all design modifications and equivalents falling under the technical scope of the present invention.

For example, it is also possible to provide the heat sink 90 with two independent chambers and circulating a cooling medium and heating medium in the heat sink 90 independently without mixing.

Further, the shape of the rotary body in the present invention is not limited to a rod shaped one and may be a spherical shaped one as well.

REFERENCE SIGNS LIST

1 . . . temperature adjusting system
10 . . . cooling medium feed system
11 . . . pump 15 . . . chiller
151 . . . heat exchange part
20 . . . heating medium feed system
21 . . . pump
25 . . . boiler
251 . . . heat exchange part
30 . . . thermal chuck
40 . . . valve device
50 . . . the upper member
51a to 51d . . . first to fourth connection port
52a to 52f . . . first to sixth flow paths
54 . . . through hole
55 . . . large-diameter part
60 . . . the lower member
61 . . . base part
62 . . . first communicating hole
63 . . . second communicating hole
65 . . . merging section
651 . . . cylindrical wall
65a to 65f . . . first to sixth openings
70 . . . valve shaft
71 . . . large-diameter part
72 . . . first channel
73 . . . second channel
74 . . . bypass path
80 . . . motor
90 . . . heat sink

The invention claimed is:

1. A valve device configured to adjust flow volumes of a plurality of fluids for adjusting temperature of an electronic device under test,
the valve device comprising:
a plurality of flow paths through which the fluids are able to flow, the plurality of flow paths comprising:
a first flow path;
a second flow path adjacent to the first flow path;
a third flow path adjacent to the second flow path;
a fourth flow path;
a fifth flow path adjacent to the fourth flow path; and
a sixth flow path adjacent to the fifth flow path; and
a merging section into which the plurality of flow paths merge, wherein:
the merging section has a rotary body provided rotatably inside the merging section,
a first channel is formed in a circumferential surface of the rotary body,
a second channel is formed in the rotary body,
the rotary body makes the first channel face at least two flow paths among the plurality of flow paths so as to connect the at least two flow paths,
the first channel has a first opening width that is tapered at the ends of the first channel,
the first opening width is along a rotational axis of the rotary body, and
the rotary body can rotate among:
a first rotary position where the first channel faces the first flow path and the second flow path, and where the second channel faces the fourth flow path and the fifth flow path,
a second rotary position where the first channel faces the first flow path, the second flow path, and the third flow path, and where the second channel faces the fourth flow path, the fifth flow path, and the sixth flow path, and
a third rotary position where the first channel faces the second flow path and the third flow path, and where the second channel faces the fifth flow path and the sixth flow path.

2. The valve device as set forth in claim 1, wherein
the rotary body is a shaft provided rotatably inside the merging section, and
the first channel is formed in a circumferential surface of the shaft.

3. The valve device as set forth in claim 1, wherein the second channel is formed in the rotary body at a position symmetric with respect to the first channel around the rotational axis.

4. The valve device as set forth in claim 3, wherein the second channel has a second opening width that is tapered at the ends of the second channel, and
the second opening width is along the rotational axis.

5. The valve device as set forth in claim 1, wherein the rotary body has a bypass path running through the rotary body.

6. The valve device as set forth in claim 5, wherein
the plurality of flow paths merge into the merging section radially, and
the first channel, the second channel, and the bypass path are arranged substantially in parallel.

7. The valve device as set forth in claim 1, wherein
the first flow path is a first inflow path from which a cooling medium flows in,
the second flow path is an outflow path from which at least one of the cooling medium or a heating medium flows out, and
the third flow path is a second inflow path from which the heating medium flows in.

8. The valve device as set forth in claim 7, wherein when the rotary body is at the second rotary position, the cooling medium flowing in from the first inflow path and the heating medium flowing in from the second inflow path are mixed at the outflow path.

9. The valve device as set forth in claim 1, wherein
the fourth flow path is a first return path returning a cooling medium,
the fifth flow path is a third inflow path from which at least one of the cooling medium or a heating medium flows in, and
the sixth flow path is a second return path return path returning the heating medium.

10. The valve device as set forth in claim 9, wherein when the rotary body is at the second rotary position, fluid flowing in from the third inflow path is divided between the first return path and the second return path.

11. The valve device as set forth in claim 1, wherein
the rotary body has a bypass path running through the rotary body,
when the rotary body is at the first rotary position, the bypass path connects the third flow path and the sixth flow path, and
when the rotary body is at the third rotary position, the bypass path connects the first flow path and the fourth flow path.

12. The valve device as set forth in claim 1, wherein the first to sixth flow paths are connected to the merging section at equal intervals.

13. The valve device as set forth in claim 1, wherein further comprising a rotation driving device configured to turn the rotary body.

14. The valve device as set forth in claim 1, wherein the rotary body is a moving body provided slidably inside the merging section.

15. The valve device as set forth in claim 14, wherein a second channel is formed in the moving body at a symmetric position with respect to the first channel.

16. The valve device as set forth in claim 15, wherein the second channel has an opening width gradually reduced toward its end parts.

17. The valve device as set forth in claim 14, wherein the moving body has a bypass path running through the moving body.

18. A valve device configured to adjust flow volumes of a plurality of fluids for adjusting temperature of an electronic device under test,
the valve device comprising:
a plurality of flow paths through which the fluids are able to flow; and
a merging section into which the plurality of flow paths merge, wherein
the merging section has a switching member internally and a first channel is formed in the switching member,
the switching member makes the first channel face at least two flow paths among the plurality of flow paths so as to connect the at least two flow paths,
the switching member is a rotary body provided rotatably inside the merging section,
the plurality of flow paths include:
a first flow path;
a second flow path which is adjacent to the first flow path; and
a third flow path which is adjacent to the second flow path,
the rotary body can rotate among
a first rotary position where the first channel faces the first flow path and the second flow path,
a second rotary position where the first channel faces the first flow path, the second flow path, and the third flow path, and
a third rotary position where the first channel faces the second flow path and the third flow path,
the first flow path is a first inflow path from which a cooling medium flows in,
the second flow path is an outflow path from which at least one of the cooling medium or a heating medium flows out,
the third flow path is a second inflow path from which the heating medium flows in, and
the first channel has an opening width gradually reduced toward its end parts so that flow volume of fluid flowing from the first inflow path and the second inflow path to the outflow path is substantially constant.

19. A valve device configured to adjust flow volumes of a plurality of fluids for adjusting temperature of an electronic device under test,
the valve device comprising:
a plurality of flow paths through which the fluids are able to flow; and
a merging section into which the plurality of flow paths merge, wherein
the merging section has a switching member internally and a first channel is formed in the switching member,
the switching member makes the first channel face at least two flow paths among the plurality of flow paths so as to connect the at least two flow paths,
the switching member is a rotary body provided rotatably inside the merging section,
the plurality of flow paths include:
a first flow path;
a second flow path which is adjacent to the first flow path; and
a third flow path which is adjacent to the second flow path,
the rotary body can rotate among
a first rotary position where the first channel faces the first flow path and the second flow path,
a second rotary position where the first channel faces the first flow path, the second flow path, and the third flow path, and
a third rotary position where the first channel faces the second flow path and the third flow path,
the plurality of flow paths further include:
a fourth flow path;
a fifth flow path which is adjacent to the fourth flow path; and
a sixth flow path which is adjacent to the fifth flow path,
a second channel is formed in the rotary body,
when the rotary body is at the first rotary position, the second channel faces the fourth flow path and the fifth flow path,
when the rotary body is at the second rotary position, the second channel faces the fourth flow path, the fifth flow path, and the sixth flow path,
when the rotary body is at the third rotary position, the second channel faces the fifth flow path and the sixth flow path,
the fourth flow path is a first return path returning a cooling medium,
the fifth flow path is a third inflow path from which at least one of the cooling medium or a heating medium flows in,
the sixth flow path is a second return path returning the heating medium, and
the second channel has an opening width gradually reduced toward its end parts so that flow volume of fluid flowing from the third inflow path to the first return path and the second return path is substantially constant.

* * * * *